(12) United States Patent
Hu et al.

(10) Patent No.: US 11,216,194 B2
(45) Date of Patent: Jan. 4, 2022

(54) MEMORY MANAGEMENT SYSTEM AND METHOD THEREOF

(71) Applicant: ALIANE TECHNOLOGIES CORPORATION, Taipei (TW)

(72) Inventors: Chia-Chen Hu, Taipei (TW); Huai-En Chen, Taipei (TW)

(73) Assignee: ALIANE TECHNOLOGIES CORPORATION, Taipei (TW)

( * ) Notice: Subject to any disclaimer, the term of this patent is extended or adjusted under 35 U.S.C. 154(b) by 0 days.

(21) Appl. No.: 16/812,580

(22) Filed: Mar. 9, 2020

(65) Prior Publication Data
US 2020/0210081 A1    Jul. 2, 2020

Related U.S. Application Data

(63) Continuation-in-part of application No. 15/297,745, filed on Oct. 19, 2016, now abandoned.

(51) Int. Cl.
*G06F 3/06* (2006.01)
*G06F 13/16* (2006.01)
*G06F 13/40* (2006.01)
*G06F 13/42* (2006.01)

(52) U.S. Cl.
CPC .......... *G06F 3/0631* (2013.01); *G06F 3/0604* (2013.01); *G06F 3/064* (2013.01); *G06F 3/0644* (2013.01); *G06F 3/0673* (2013.01); *G06F 13/1668* (2013.01); *G06F 13/4027* (2013.01); *G06F 13/4282* (2013.01); *G06F 2213/0026* (2013.01)

(58) Field of Classification Search
CPC ....... G06F 3/0604; G06F 3/0631; G06F 3/067
See application file for complete search history.

(56) References Cited

U.S. PATENT DOCUMENTS

| | | |
|---|---|---|
| 8,161,161 B2 | 4/2012 | Iino |
| 2009/0319604 A1 | 12/2009 | Hatasaki |
| 2013/0159622 A1 | 6/2013 | Cohen |
| 2016/0274814 A1 | 9/2016 | Zhang |
| 2017/0031593 A1 | 2/2017 | Tsirkin |

(Continued)

OTHER PUBLICATIONS

Non-Final Office Action dated Mar. 28, 2018 for U.S. Appl. No. 15/297,745 (parent application).

(Continued)

*Primary Examiner* — Masud K Khan
(74) *Attorney, Agent, or Firm* — Schmeiser, Olsen & Watts, LLP

(57) ABSTRACT

A memory management system and a method thereof are introduced. The memory management system can be configured to do memory management for a device system with a plurality of host devices. A memory block is coupled to a central processing unit. The system is configured to determine a number of the host devices configured in the device system; provide a corresponding device code to each host device; determine the memory capacity of the memory block; and allocate memory to each host device and accordingly build an allocation table. When the host device requests the central processing unit for accessing data, the central processing unit responds to the host device according to the allocation table, such that the host device uses the memory block to access data.

10 Claims, 5 Drawing Sheets

(56) References Cited

U.S. PATENT DOCUMENTS

2017/0337007 A1    11/2017  Tailliet
2018/0192540 A1*  7/2018  Kumar .................. G06F 3/0689

OTHER PUBLICATIONS

Final Office Action dated Oct. 18, 2018 for U.S. Appl. No. 15/297,745 (parent application).
Non-Final Office Action dated Feb. 26, 2019 for U.S. Appl. No. 15/297,745 (parent application).
Final Office Action dated Oct. 9, 2019 for U.S. Appl. No. 15/297,745 (parent application).

* cited by examiner

| the number of the host devices | 8 | 512GB | the memory capacity of the memory block |
| --- | --- | --- | --- |
| | 0 | 16GB | |
| | 1 | 64GB | |
| the device code | ⋮ | ⋮ | the memory capacity of the memory |
| | 7 | 2GB | |

FIG.2

MEMORY MANAGEMENT SYSTEM AND METHOD THEREOF

CROSS-REFERENCE TO RELATED APPLICATION

This application is a continuation-in-part patent application of U.S. application Ser. No. 15/297,745 filed on Oct. 19, 2016, the entire contents of which are hereby incorporated by reference for which priority is claimed under 35 U.S.C. § 120.

BACKGROUND OF THE INVENTION

1. Field of the Invention

The instant disclosure relates to a memory management system and a method thereof; in particular, to a memory management system and a method thereof that help the central processing unit of a server to do memory management for a device system.

2. Description of the Related Art

Recently, the cost of common computer hardware has been quite reasonable, and large server systems have been more and more the norm, and thus virtual devices have become valued more by people. The virtual device can be considered an interface between the software and the computer system to provide resources of the computer system to the software. Usually, the software is an operating system. The operating system can access the resources of the computer system through the virtual device. A plurality of virtual devices can be configured in one computer system, and different virtual devices can run different operating systems. For example, the Windows® operating system and the Linux operating system can be respectively run by different virtual devices in the same computer system. In brief, the virtual device must be a host device. According to the requirements of different users, different host devices may be assigned different tasks. Thus, how to effectively allocate resources (especially the memory) of a computer system to different host devices according to requirements of different users is still worth discussing.

Conventionally, a number of servers each including a processor, memory, hard disk, network card, and power unit are mounted in a server rack that is a frame for mounting multiple electronic equipment modules, such as the servers. Within a single rack, multiple servers may be coupled together to perform common tasks. The rack-mounted servers have the advantages of expandability and effectiveness. However, as the number of servers increasing, such as those in a datacenter, for example, hundreds or thousands of servers are mounted in a number of server racks, causing issues of physical space usage, heat dissipation, computing resource management, and complexity of deploying a fully configurable system with the rack-mounted servers.

BRIEF SUMMARY OF THE INVENTION

The instant disclosure provides a memory management method. In an embodiment, this memory management method can be used to help a central processing unit of a server to do memory management for a device system. A memory block is connected to the central processing unit of the server, and there is a plurality of host devices configured in the device system. This memory management method comprises: determining a number of the host devices configured in the device system; providing a corresponding device code to each host device; determining the memory capacity of the memory block; and allocating memory to each host device and accordingly building an allocation table. When the host device makes a request to the central processing unit for accessing data, the central processing unit responds to the host device according to the allocation table, such that the host device uses the memory block to access data.

The instant disclosure further provides a memory management system. In an embodiment, this memory management system can be configured on a mother board of a server to help a central processing unit of the server to do memory management. A memory block is connected to the central processing unit of the server, and there is a plurality of host devices configured in the device system. The memory management system comprises a memory allocation module and an interconnection module. The memory allocation module is configured for: determining a number of the host devices configured in the device system; providing a corresponding device code to each host device; determining the memory capacity of the memory block; and allocating memory to each host device and accordingly building an allocation table. The interconnection module is connected between the memory allocation module and the host devices of the device system. When the host device sends a request signal for accessing data, the interconnection module converts the request signal and transmits the converted request signal to the central processing unit. After that, the central processing unit responds to the request signal of the host device according to the allocation table such that the host device uses the memory block to access data.

As exemplified above, the major achievement of the memory management system and the memory management method provided by the above embodiments of the instant disclosure is to help the central processing unit to allocate memory to each host device to use. In addition, the memory management system provided by the instant disclosure can be directly configured on the mother board of a server. Thus, provided with the requirements and the needs of a general client or an enterprise client, a customized memory management system can be built. After that, this customized memory management system can be directly configured on the mother board of a server of the general client or the enterprise client, and it can start to help the central processing unit to allocate memory to each host device to use.

In some embodiments, a memory management method, comprising: providing a memory management system including a memory allocation module, an interconnection module, and a central processing unit, where the central processing unit is coupled between a memory block and the memory allocation module, wherein the memory block serves as primary memory, and the interconnection module is coupled to the memory allocation module and used for being physically coupled to a physical device system includes a plurality of host devices, which are capable of individually requesting the central processing unit for memory resource of the memory block; determining, by the memory allocation module, a number of the host devices configured in the physical device system; providing, by the memory allocation module, a corresponding device code to each host device; determining, by the memory allocation module, the memory capacity of the memory block; and allocating, by the memory allocation module, memory to each host device and accordingly building an allocation table. When one of the host devices of the physical device system sends a request signal to the central processing unit to request memory resources of the memory block for accessing data, the interconnection module converts the request signal and transmits the converted request signal to the central processing unit, the central processing unit responds to the request signal from the one of the host devices according to the device code of the one of the host devices and the allocation table, such that the one of the host devices is allowed to use a portion of the memory block to access data.

In some embodiments, a memory management system comprising: a central processing unit; a memory allocation module, wherein the central processing unit is coupled between a memory block and the memory allocation module, and the memory block serves as primary memory; and an interconnection module, coupled to the memory allocation module and being physically coupled to a physical device system, wherein the physical device system includes a plurality of host devices which are capable of individually requesting the central processing unit for memory resource of the memory block. The memory allocation module is configured for: determining a number of the host devices configured in the physical device system; providing a corresponding device code to each host device; determining the memory capacity of the memory block; and allocating memory to each host device and accordingly building an allocation table; and wherein when one of the host devices of the physical device system sends a request signal for accessing data to the central processing unit to request memory resources of the memory block, the interconnection module converts the request signal and transmits the converted request signal to the central processing unit, and the central processing unit responds to the request signal of the one of the host devices according to the device code of the one of the host devices and the allocation table such that the one of the host devices is allowed to use a portion of the memory block to access data.

In some embodiments, the physical device system is a computing pool or a computing and memory pool.

In some embodiments, the memory block is a memory pool.

As illustrated in the above embodiments, a memory management or device can be implemented to facilitate expansion of primary memory resource for computing pools (e.g., CPU and/or GPU pools) and/or a computing and memory pool (e.g., CPU and/or GPU pools, with memory) so that a new primary memory resource can be utilized in the pooled rack sever system when additional primary memory resource is required, thereby enhancing system performance.

For further understanding of the instant disclosure, reference is made to the following detailed description illustrating the embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements.

FIG. 2 shows a schematic diagram of an allocation table of an embodiment of the instant disclosure.

DETAILED DESCRIPTION OF THE INVENTION

The aforementioned illustrations and following detailed descriptions are exemplary for the purpose of further explaining the scope of the instant disclosure. Other objectives and advantages related to the instant disclosure will be illustrated in the subsequent descriptions and appended drawings. In addition, for an easy instruction, similar reference numbers or symbols refer to elements alike.

[An Embodiment of the Memory Management Method]

The memory management method provided by this embodiment is mainly to help a central processing unit of a server of a general client or an enterprise client to do memory management for a device system they use. The detailed descriptions are as follows.

Figure 1:
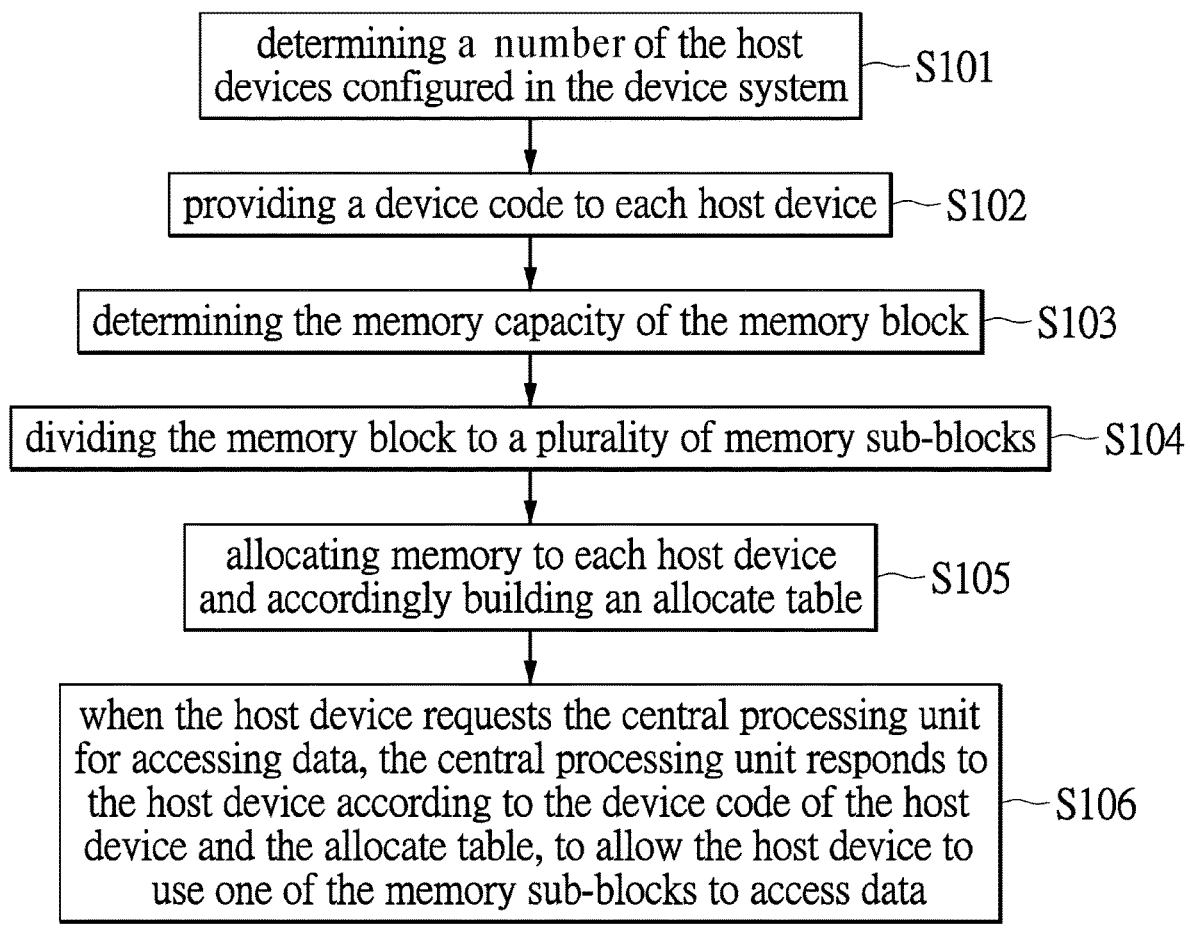
FIG. 1 shows a flow chart of a memory management method of an embodiment of the instant disclosure.

Referring to FIG. 1, a flow chart of a memory management method is illustrated according to an embodiment of the instant disclosure. As shown in FIG. 1, the memory management method 100 provided by this embodiment is implemented by the following steps: step S101: determining a number of the host devices configured in the device system; step S102: providing a corresponding device code to each host device; step S103: determining the memory capacity of the memory block; step S104: dividing the memory block to a plurality of memory sub-blocks; step S105: allocating memory to each host device and accordingly building an allocation table; and step S106: when the host device requests the central processing unit for accessing data, the central processing unit responds to the host device according to the device code of the host device and the allocation table, to allow the host device to use one of the memory sub-blocks to access data.

Specifically speaking, in step S101, the number of the host devices configured in a device system is determined based on different requirements of a general client or an enterprise client. The device system herein refers to a plurality of host devices configured on the server of a general client or an enterprise client, wherein each host device in the device system can be provided to one user for use. When a host device is used by a user, the physical resources of the server may be requested for accessing data. In this embodiment, the physical resources of the server refer to the memory.

After that, in step S102, a device code is provided to each host device in the device system. If, for example, the number of the host devices configured in the device system is determined to be 8, in step S102, these eight host devices in the host system each are respectively given a corresponding device code, for example, from 0 to 7, but it is not limited herein.

In step S103, the memory capacity of the memory block is determined. The memory block herein refers to the above described physical resources of the server. In this embodiment, the memory block is the Double Data Rate Synchronous Dynamic Random Access Memory (DDR SDRAM). For easy instruction, in this step, the memory capacity of the memory block is determined as 512 GB. In addition, in step S104, the memory block is further divided to a plurality of memory sub-blocks. In other words, in this step, this 512 GB memory block is divided to a plurality of memory sub-blocks. The memory capacity of these memory sub-blocks can be 1 GB, 2 GB, 4 GB, 8 GB, 16 GB and the like. The memory capacity of the memory sub-blocks may be all different, or some of the memory sub-blocks may have the same memory capacity.

The reason why the memory block is divided to a plurality of memory sub-blocks in step S104 is that, the general client or the enterprise client may assign different tasks to different host devices (that is, different host devices may be used to do different work). After the memory block is divided to the 1 GB, 2 GB, 4 GB, 8 GB, 16 GB memory sub-blocks or the like, in step S105, these memory sub-blocks are allocated to each host device. It should be noted that, the memory capacity of the one memory sub-block that the host device is allowed to use equals the memory capacity of the memory allocated to the host device according to the allocation table. Take the above case for example, the memory capacity of the memory sub-block that is allocated to each host device needs to be 1 GB, 2 GB, 4 GB, 8 GB, 16 GB or the like.

In step S105, an allocation table is built. This allocation table records a relationship between the corresponding device code of each host device and the memory allocated to each host device. Referring to FIG. 2, FIG. 2 shows a schematic diagram of an allocation table of an embodiment of the instant disclosure. According to the allocation table shown in FIG. 2, the memory capacity of the memory sub-block allocated to the host device having a device code "0" is 16 GB, the memory capacity of the memory sub-block allocated to the host device having a device code "1" is 64 GB, and the memory capacity of the memory sub-block allocated to the host device having a device code "7" is 2 GB. However, the allocation table shown in FIG. 2 is only for illustrating how those memory sub-blocks are allocated to the host devices but not for restricting the instant disclosure. Additionally, in this embodiment, the allocation table records the determined memory capacity of the memory block (that is, the allocation table in FIG. 2 records that the determined memory capacity of the memory block is 512 GB). The allocation table also records the determined number of the host devices of the device system (that is, the allocation table in FIG. 2 records that the determined number of the host devices of the device system is 8).

Finally, in step S106, when a user operates one host device of the device system, this host device requests the central processing unit for accessing data. The central processing unit first recognizes the device code of the host device, and then responds to the host device according to the recognized device code and the allocation table. Herein, the response from the central processing unit is to allow the host device to use one of the memory sub-blocks for accessing data, wherein the memory capacity of the memory sub-block the host device is allowed to use is determined according to the allocation table. As described, the memory capacity of the memory sub-blocks may be all different, or some of the memory sub-blocks have the same memory capacity. Thus, in the allocation table, different device codes may be respectively corresponded to memory sub-blocks having the same memory capacity.

It is worth mentioning that, in this embodiment, the device system can be a physical device system or a virtual device system. In other words, the memory management method provided by this embodiment can be adapted to a virtual device system comprising a plurality of virtual devices. Herein, the virtual device refers to the so-called Virtual Machine (VM).

[An Embodiment of the Memory Management System]

Figure 3:
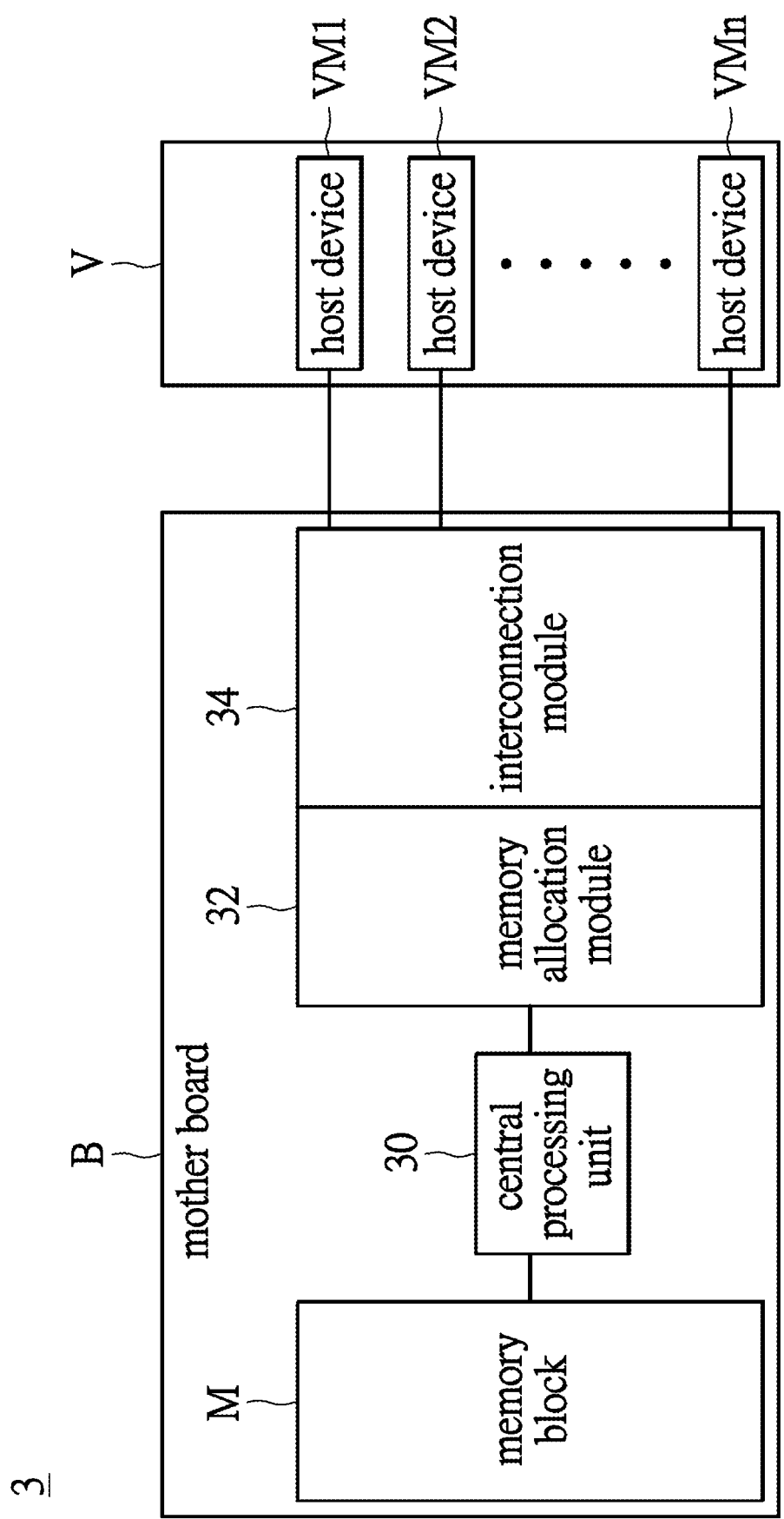
FIG. 3 shows a block diagram of a memory management system of an embodiment of the instant disclosure.

The memory management system provided by this embodiment is used to implement the memory management method provided by the above embodiment. Referring to FIG. 3, a memory management system of an embodiment of the instant disclosure is shown in a block diagram form.

The memory management system 3 in this embodiment is mainly used to help the central processing unit 30 of a server to do memory management for a device system V. As shown in FIG. 3, a memory block M is connected to the central processing unit 30 on the mother board B. There is a plurality of host devices VM1, VM2, . . . , VMn configured in the device system V, wherein "n" is a positive integer. In this embodiment, the memory block is also the Double Data Rate Synchronous Dynamic Random Access Memory (DDR SDRAM), and the number of the host devices configured in the device system V, which is "n", is determined based on the requirement and needs of different clients.

The memory management system 3 provided by this embodiment comprises a memory allocation module 32 and an interconnection module 34. The memory allocation module 32 and the interconnection module 34 are directly configured on the mother board B of a server. The interconnection module 34 can be the Peripheral Component Interconnect Express (PCI-E) bus, the Signal Root I/O Virtualization (SRIOV) bus or the Multi Root I/O Virtualization (MRIOV) bus. Preferably, the interconnection module 34 is implemented by the Signal Root I/O Virtualization (SRIOV) bus. In addition, the memory allocation module 32 can be implemented by a Field-Programmable Gate Array (FPGA) chip, for example. The FPGA chip is reprogrammable, so that the instant disclosure can provide a customized memory management system for a client. However, the implementation of the present disclosure is not limited to the examples above. For example, the memory allocation module 32 may be implemented by an integrated circuit (IC) chip, which may be an application-specific integrated circuit (ASIC) chip, or a dedicated chip, and so on.

By programming the memory allocation module 32 (e.g., a FPGA chip), the number of the host devices VM1, VM2, . . . , VMn in the device system V can be determined. After that, according to the requirement and needs of a general client or an enterprise client, the memory allocation module 32 determines the memory capacity of the memory block, and divides the memory block to a plurality of memory sub-blocks (not shown). Finally, again by programming the memory allocation module 32, the memory capacity of the memory sub-block that each host device VM1, VM2, . . . , VMn is allowed to use can be determined, and then an allocation table can be accordingly built. This allocation table records the relationship between the corresponding device code of each host device and the memory allocated to each host device, but the details relevant to the allocation table are omitted herein because they have been described in the last embodiment and FIG. 2.

When a user operates one host device VM1, VM2, . . . , VMn configured in the device system V, this host device requests the central processing unit for accessing data. After recognizing the device code of the host device, the central processing unit responds to the host device according to the allocation table and the recognized device code. Herein, the response from the central processing unit is to allow the host devices to use one of the memory sub-blocks (not shown) for accessing data, and particularly the memory capacity of the memory sub-block the host device is allowed to use is determined according to the allocation table.

As described, the memory capacity of the memory sub-blocks may be all different, or some of the memory sub-blocks may have the same memory capacity. Thus, according to the allocation table, different device codes may be corresponded to the memory sub-blocks that have the same memory capacity. In any case, the memory that is allocated to each host device VM1, VM2, . . . , VMn must be equal to the memory capacity of one of the memory sub-blocks. Therefore, how to divide the memory block to a plurality of memory sub-blocks is determined by the memory that each host device VM1, VM2, . . . , VMn needs to do its work or can be allowed to use.

According to the above description, the device system in this embodiment can be a physical device system or a virtual device system. In an example, the memory management system provided by this embodiment can do the memory management for a virtual device system having a plurality of virtual devices. Herein, the virtual device refers to the so-called Virtual Machine (VM). In recent years, to simplify the management of a server and a corresponding device system, more and more enterprise clients tend to use a virtual device system. Virtual machines in the virtual device system are given different tasks according to the requirement and needs of different enterprise clients. The instant disclosure can provide a customized memory management system and a corresponding memory management method, such that the memory resource can be simply and efficiently allocated to each virtual machine in the virtual device system used by every client. Certainly, the implementation of the present disclosure is not limited to the examples above.

The memory management method and the memory management system provided by the above embodiment of the instant disclosure can help a central processing unit of a server to do memory management for a device system linked to the server. The memory management method and the memory management system provided by the above embodiment of the instant disclosure can be customized by the requirements and needs of clients. In addition, the memory management system provided by the instant disclosure can be directly configured on the mother board of a server. Therefore, as long as a customized memory management system is directly configured on the mother board of a client server, the client can have its own memory management system to do memory management for host devices that are responsible for different work. Certainly, the implementation of the present disclosure is not limited to the examples above.

In the above embodiments, the device system V, as illustrated in FIG. 3, can be a physical device system, each host device of which is a physical host device, for example, including a processing unit, or including a processing unit and a memory coupled to the processing unit. In this manner, the memory management system 3 in FIG. 3 performs memory management for a physical device system including a plurality of physical host devices (indicated by symbols VM1, VM2, . . . , VMn) configured in the physical device system, wherein "n" is a positive integer. As shown in FIG. 3, the memory block M is electrically coupled or connected to the central processing unit 30. In an embodiment, the memory block M may indicate one or more memory units as main or primary memory for use by the physical host devices. For example, the memory block M may be DRAM-based volatile memory, such as based on Double Data Rate Synchronous Dynamic Random Access Memory (DDR SDRAM), for a specific generation, such as DDR, DDR2, DDR3, DDR4, or DDR5 and so on.

Furthermore, it is noted that the memory management system 3 in FIG. 3 inherently is capable of facilitating memory expansion for pooled computing resource in a resource pooling architecture based on the use of one or more resource pools. A pooled rack sever system can be implemented in accordance with the resource pooling architecture which is different from the traditional rack server. In brief, the pooled rack sever system is implemented by separating different corresponding devices into several pooled groups (e.g., GPU pool, power device pool, storage pool, and I/O pool) that can be expanded and the user is able to manage every group individually, as compared with the traditional sever based on a conventional computer which is built with a dedicated CPU, primary memory, power, I/O, GPU and HDD and so on, and cannot be extended in accordance with user's or practical requirements. As will be shown below, a memory management or device can be implemented, based on that of FIG. 3, to facilitate expansion of primary memory resource for computing pools (e.g., CPU and/or GPU pools) and/or a computing and memory pool (e.g., CPU and/or GPU pools, with memory) so that a new primary memory resource can be utilized in the pooled rack sever system when additional primary memory resource is required, thereby enhancing system performance.

Figure 4:
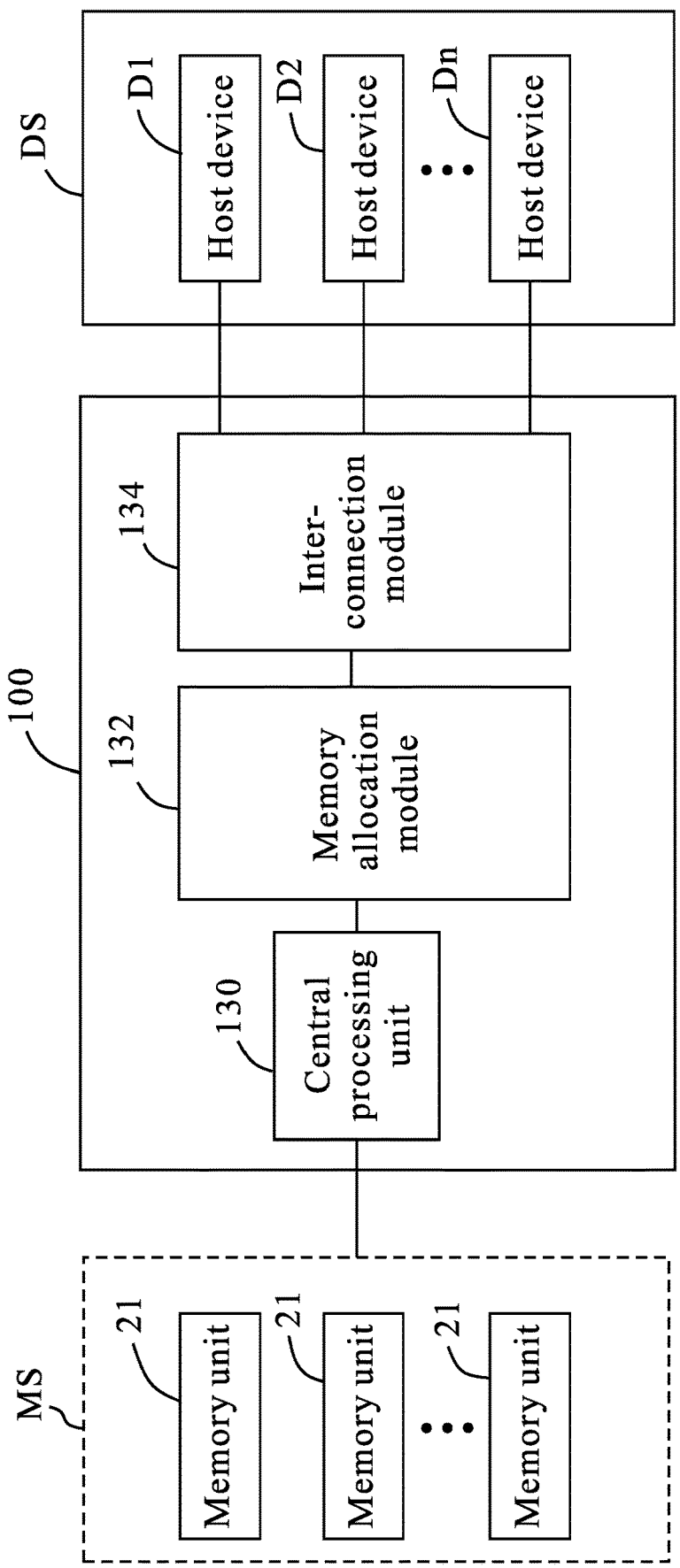
FIG. 4 is a schematic block diagram illustrating a memory management system of another embodiment of the present disclosure.

Referring to FIG. 4, a memory management system of another embodiment of the present disclosure is illustrated in a schematic block diagram form. As shown in FIG. 4, a memory management system 100, based on that of FIG. 3, is used for performing memory management for a device system DS so as to utilize memory resource of a memory system MS. The device system DS serves as a computing pool including a plurality of host devices D1, D2, . . . , Dn, each of which is a physical host device, for example, including a processing unit, or including a processing unit and a memory coupled to the processing unit. The memory system MS is a memory pool as main or primary memory for use by the host devices D1, D2, . . . , Dn. For example, the memory system MS may including a plurality of memory units 21, for example, DRAM-based volatile memory, such as based on Double Data Rate Synchronous Dynamic Random Access Memory (DDR SDRAM), for a specific generation, such as DDR, DDR2, DDR3, DDR4, or DDR5 and so on.

As shown in FIG. 4, the memory management system 100 includes a central processing unit 130, a memory allocation module 132, and an interconnection module 134, which may be implemented based on any one of the embodiments as illustrated in FIG. 1, 2 or 3. The central processing unit 130 is coupled to the memory system MS and coupled to the host devices D1, D2, . . . , Dn by way of the memory allocation module 132 and an interconnection module 134. The central processing unit 130 may be implemented by performing any one of the embodiments of the central processing unit 30.

As illustrated in FIG. 4, the memory management system 100 serves as a role of efficient resource allocation so as to facilitate the implementation of a pooled rack server system based on a resource pooling architecture with respect to a computing pool (e.g., the device system DS) and a memory pool (e.g., the memory system MS). Because the memory system MS is used as main or primary memory for the device system DS, the memory management system 100 employs the memory allocation module 132, which may be implemented based on any one of the embodiments of the memory allocation module 32, to perform memory allocation with the benefit of hardware performance of computing. The memory allocation module 132 may be implemented by an integrated circuit (IC) chip, for example, a programmable chip, such as a field-programmable gate array (FPGA) chip, an application-specific integrated circuit (ASIC) chip, or a dedicated chip, and so on, wherein the IC chip includes hardware computing components for performance acceleration. In addition, the memory management system 100 employs the interconnection module 134, which may be implemented based on any one of the embodiments of the interconnection module 34, to perform interconnection to the device system DS. The interconnection module 134 may be implemented by using a circuit module for connection and signaling for Peripheral Component Interconnect Express (PCI-E) bus (e.g., generation 3th, $4^{th}$, and so on), the Signal Root I/O Virtualization (SRIOV) bus, the Multi Root I/O Virtualization (MRIOV) bus, or a Signal Root I/O Virtualization (SRIOV) bus. Certainly, the implementation of the present disclosure is not limited to the examples above.

Further, in some embodiments, the central processing unit 130 and the memory allocation module 132 may be integrated and implemented by an integrated circuit so as to make the memory management system 100 more compact in size.

The memory management system 100 in FIG. 4 can facilitate the implementation of a pooled rack server system based on a resource pooling architecture, as will be illustrated in the following.

Figure 5:
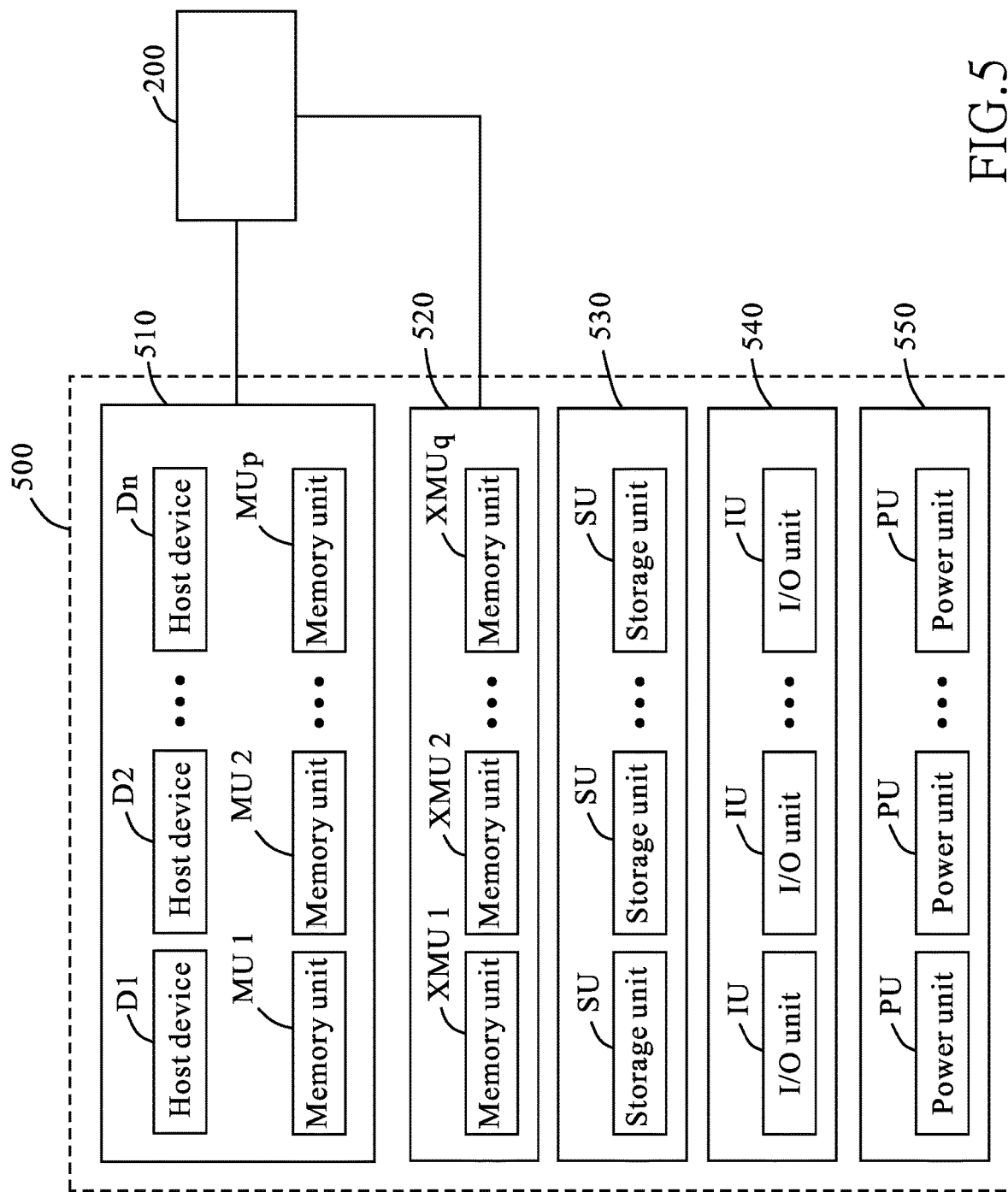
FIG. 5 is a schematic diagram illustrating an implementation of a pooled rack server system based on a resource pooling architecture according to an embodiment of the present disclosure.

As compared with the conventional rack mounted servers, an implementation of a pooled rack server system based on a resource pooling architecture is introduced in FIG. 5, by disaggregating processors, memory, storage devices, and networking resources of a plurality of conventional servers into respective resource pools. In an embodiment, a memory management device can be implemented based on the memory management system 100 to facilitate primary memory expansion for a computing and memory pool in an implementation of a pooled rack server system based on a resource pooling architecture. Referring to FIG. 5, an implementation of a pooled rack server system based on a resource pooling architecture is illustrated according to an embodiment. In FIG. 5, a pooled rack server system 500 includes a plurality of resource pools, for examples, a computing and memory pool 510, a storage pool 530, and an input/output pool 540. The computing and memory pool 510 includes a plurality of host devices (for example, processing units) D1, D2, . . . , Dn and a plurality of memory units indicated by MU1, MU2, . . . , MUp, wherein n and p are integers greater than 1; n is equal to or larger than p (e.g., n=8, p=8; n=10, p=20; n=8, p=32); and the memory units can be of the same or respective memory capacity. In an exemplary embodiment, each of the host devices (e.g., a processing unit) can be configured to be coupled to at least one associated memory unit of the memory units for performing instructions for its own tasks. In the computing and memory pool 510, the host devices are disposed on a circuit board and electrically coupled to an interface or bus, such as PCI-E bus, and the memory units MU1 to MUp are also disposed on the circuit board, for example, through respective memory sockets (not shown, for sake's of brevity), and electrically coupled to a common interface or bus, such as PCI-E bus or an internal bus, for communicatively being coupled to the associated host devices. The storage pool 530 is used for secondary memory where programs and data are kept on a long-term basis, for example, for possible future use or for record-keeping purposes, and often for data backup or storage. The storage pool 530 includes a plurality of storage units SU, such as solid-state devices (SSD) or hard disk drives (HDD). The input/output pool 540 includes a plurality of input/output (I/O) units IU for providing I/O interconnections (e.g., networking interconnections). Certainly, the implementation of the present disclosure is not limited to the examples above. The pooled rack server system 500 may include another resource pool, such as a power device pool 550 (e.g., AC to DC and/or DC to DC power adaptors and so on) for powering the above resource pools (such as 530, 540 and so on) with heat dissipation.

As shown in FIG. 5, the pooled rack server system 500 is an implementation of a resource pooling architecture by disaggregating processors storage, memory, and networking resources of a plurality of conventional servers, a datacenter administrator can then flexibly assign those resources to meet the demands of individual workloads. This resource pooling architecture brings flexible deployment, component redundancy capability, better resource utilization, so as to reduce the total operational expenditures.

In a situation that the computing and memory pool 510 needs to expand its main memory for performance enhancement, a memory management device 200 implemented based on the memory management system 100 in FIG. 4 can be employed (e.g., by connection to the computing and memory pool 510) to facilitate primary memory expansion. As shown in FIG. 5, a memory pool 520 including a plurality of memory units XMU1 to XMUq (where q is an integer) can be added to (e.g., mounted in) the pooled rack server system 500 and is coupled to the computing and memory pool 510 through the memory management device 200. Since the memory management device 200 has the benefit of efficient resource allocation due to its implementation based on the memory management system 100 in FIG. 5, the computing and memory pool 510 is allowed to further utilize the memory resource of the memory pool 520 as expanded main or primary memory, thus preventing the issues of latency between processing unit and memory.

In another embodiment, a memory management device can be implemented based on the memory management system 100 to facilitate a primary memory pool and a computing pool in another implementation of a resource pooling architecture of a pooled rack server system in which the computing and memory pool 510 in FIG. 5 is replaced with a computing pool including a plurality of host devices (for example, processing units) D1, D2, . . . , Dn, and the memory pool 520 can serve as a primary memory pool.

In a scenario that the computing and memory pool 510 in FIG. 5 is required to be upgraded for performance enhancement, for example, by substituting a new computing and memory pool that employs processors and/or memory of upgraded technology for the current computing and memory pool, there are various approaches to physical memory resource usage due to the utilization of the memory management device 200. In one exemplary approach, after the substitution of the new computing and memory pool for the previous computing and memory pool 510, the memory pool 520 can still be utilized in the pooled rack server system 500 and can be coupled to the new computing and memory pool (or new computing pool) through the memory management device 200. In another exemplary approach, if it is supposed that before the substitution, the memory units of the computing and memory pool 510 are memory modules (e.g., DDR4 (or DDR5) dual in-line memory module (DIMM)) which (e.g., in specification) outperform the memory units (e.g., DDR3 DIMM) of the memory pool 520, the memory units of the previous computing and memory pool 510 can be reused by the replacement of the memory units of the memory pool 520 with the memory units (e.g., through corresponding memory sockets) detached from the previous computing and memory pool 510 (e.g., through corresponding memory sockets), in addition to the substitution. In yet another exemplary approach, under the same supposition, the memory units of the previous computing and memory pool 510 can be reused by the insertion of the memory units detached from the previous computing and memory pool 510 (e.g., through corresponding memory sockets) into the new computing and memory pool, in addition to the substitution. Since the memory management device 200 has the benefit of efficient resource allocation due to its implementation based on the memory management system 100 in FIG. 4, the computing and memory pool 510 is allowed to utilize the memory resource of the memory pool 520 as main or primary memory, thus preventing the issues of wasting resources, latency between processing unit and memory and also saving hardware resource and cost. In this manner, the memory management device 200 as illustrated in FIG. 5 can also save the hardware resource and facilitate the utilization and flexible deployment of the memory resource.

Further, it is noted that the technical effects of efficient resource allocation provided by the memory management device 200 in the above embodiments are different from the storage expansion functionality of the conventional storage device (such as solid-state devices (SSD), hard disk drives (HDD). The storage expansion functionality of the conventional storage device (such as SSD, HDD) merely needs an adapter for implementation of data conversion between the host device and memory of the storage device. By contrast, the memory management device used in the above embodiments for the primary memory expansion or primary memory requires the efficient resource allocation provided by the memory management system in FIG. 4 so as to fulfil the computing performance requirements of CPU and memory data access. Specifically, in the memory management system 100, the central processing unit 130 efficiently handles the request from the host devices and the memory allocation module 132 performs memory allocation, and the interconnection module 134 is configured to provide effective and efficient linking to the host devices, thus achieving the technical effects of efficient memory allocation and facilitating primary memory expansion in the implementation of a pooled rack server system based on the resource pooling architecture.

As illustrated in the above embodiments, a memory management or device can be implemented, based on that of FIG. 3, to facilitate expansion of primary memory resource for computing pools (e.g., CPU and/or GPU pools) and a computing and memory pool (e.g., CPU and/or GPU pools, with memory) so that a new primary memory resource can be utilized in the pooled rack sever system when additional primary memory resource is required, thereby enhancing system performance.

While the present disclosure has been described by means of specific embodiments, numerous modifications and variations could be made thereto by those skilled in the art without departing from the scope and spirit of the present disclosure set forth in the claims.

What is claimed is:

1. A memory management method, comprising:
    providing a memory management device including a memory allocation module, an interconnection module, and a central processing unit, to facilitate primary memory expansion in a pooled rack server system, wherein the memory management device is coupled between a physical device system and a memory block; the physical device system is a computing memory pool of the pooled rack server system and the memory block is a memory pool of the pooled rack server system; the computing memory pool includes a plurality of physical host devices and a plurality of first DRAM-based volatile memory units serving as primary memory; and the memory pool includes a plurality of second DRAM-based volatile memory units serving as additional primary memory, the central processing unit is coupled between the memory block and the memory allocation module, and the interconnection module is coupled to the memory allocation module and used for being physically coupled to the plurality of physical host devices of the physical device system, which are capable of individually requesting the central processing unit for memory resource of the memory block;
    determining, by the memory allocation module, a number of the physical host devices configured in the physical device system;
    providing, by the memory allocation module, a corresponding device code to each of the plurality of physical host devices;
    determining, by the memory allocation module, the memory capacity of the memory block; and
    allocating, by the memory allocation module, memory to each of the plurality of physical host devices and accordingly building an allocation table;
    wherein when one of the physical host devices of the physical device system sends a request signal to the central processing unit to request memory resources of the memory block for accessing data, the interconnection module converts the request signal and transmits the converted request signal to the central processing unit, the central processing unit responds to the request signal from the one of the physical host devices according to the device code of the one of the physical host devices and the allocation table, such that the one of the physical host devices is allowed to use a portion of the memory block to access data.

2. The memory management method according to claim 1, wherein the allocation table records a relationship between the corresponding device code of each of the physical host devices and the memory allocated to each of the physical host devices.

3. The memory management method according to claim 1, further comprising:
    dividing the memory block to a plurality of memory sub-blocks;
    wherein when the one of the physical host devices sends the request signal to the central processing unit for accessing data, the interconnection module converts the request signal and transmits the converted request signal to the central processing unit, and the central processing unit responds to the request signal of the one of the physical host devices according to the corresponding device code of the one of the physical host devices and the allocation table, to allow the one of the physical host devices to use one of the memory sub-blocks to access data, and the memory capacity of the memory sub-block that the one of the physical host devices is allowed to use equals the memory capacity of the memory allocated to the one of the physical host devices according to the allocation table.

4. The memory management method according to claim 1, wherein the allocation table further records the determined memory capacity of the memory block and the determined number of the physical host devices configured in the physical device system.

5. The memory management method according to claim 1, wherein the one of the physical host devices of the physical device system sends the request signal for accessing the memory block through the interconnection module, and the interconnection module includes a peripheral component interconnect express (PCI-E) bus, a signal root I/O virtualization (SRIOV) bus, or the multi root I/O virtualization (MRIOV) bus.

6. A memory management system comprising:
a central processing unit;
a memory allocation module, wherein the central processing unit is coupled between a memory block and the memory allocation module, and the memory block serves as primary memory; and
an interconnection module, coupled to the memory allocation module and being physically coupled to a physical device system, wherein the memory management system operates to facilitate primary memory expansion in a pooled rack server system, the physical device system is a computing memory pool of the pooled rack server system and the memory block is a memory pool of the pooled rack server system; the computing memory pool includes a plurality of physical host devices and a plurality of first DRAM-based volatile memory units serving as primary memory; the memory pool includes a plurality of second DRAM-based volatile memory units serving as additional primary memory; and the plurality of physical host devices are capable of individually requesting the central processing unit for memory resource of the memory block;
wherein the memory allocation module is configured for:
determining a number of the physical host devices configured in the physical device system;
providing a corresponding device code to each of the plurality of physical host devices;
determining the memory capacity of the memory block; and
allocating memory to each of the plurality of physical host devices and accordingly building an allocation table; and
wherein when one of the physical host devices of the physical device system sends a request signal for accessing data to the central processing unit to request memory resources of the memory block, the interconnection module converts the request signal and transmits the converted request signal to the central processing unit, and the central processing unit responds to the request signal of the one of the physical host devices according to the device code of the one of the physical host devices and the allocation table such that the one of the physical host devices is allowed to use a portion of the memory block to access data.

7. The memory management system according to claim 6, wherein the allocation table records a relationship between the corresponding device code of each of the plurality of physical host devices and the memory allocated to each of the plurality of physical host devices.

8. The memory management system according to claim 6, wherein the memory allocation module is further configured for:
dividing the memory block to a plurality of memory sub-blocks;
wherein when the one of the physical host devices sends the request signal for accessing data, the interconnection module converts the request signal and transmits the converted request signal to the central processing unit, the central processing unit responds to the request signal of the one of the physical host devices according to the device code of the one of the physical host devices and the allocation table, to allow the one of the physical host devices to use one of the memory sub-blocks to access data, and the memory capacity of the memory sub-block that the one of the physical host devices is allowed to use equals the memory capacity of the memory allocated to the one of the physical host devices according to the allocation table.

9. The memory management system according to claim 6, wherein the allocation table further records the determined memory capacity of the memory block and the determined number of the physical host devices configured in the physical device system.

10. The memory management system according to claim 6, wherein the one of the physical host devices of the physical device system sends the request signal for accessing the memory block through the interconnection module, and the interconnection module includes a peripheral component interconnect express (PCI-E) bus, a signal root I/O virtualization (SRIOV) bus, or the multi root I/O virtualization (MRIOV) bus.

\* \* \* \* \*